Feb. 25, 1958     O. S. JENNINGS     2,824,922
CIRCUIT CONTROL DEVICE

Filed May 11, 1953                2 Sheets-Sheet 1

WITNESSES:
E. A. McCloskey
Paul A. Harlew

INVENTOR
Oliver S. Jennings.
BY
Ralph H. Swingle
ATTORNEY

Feb. 25, 1958   O. S. JENNINGS   2,824,922
CIRCUIT CONTROL DEVICE

Filed May 11, 1953   2 Sheets-Sheet 2

WITNESSES:
E. A. McCloskey.
Paul H. Harlen.

INVENTOR
Oliver S. Jennings.
BY Ralph H. Swingle
ATTORNEY

United States Patent Office 2,824,922
Patented Feb. 25, 1958

2,824,922

CIRCUIT CONTROL DEVICE

Oliver S. Jennings, Fall River, Mass., assignor to Westinghouse Electric Corporation, East Pittsburgh, Pa., a corporation of Pennsylvania Application May 11, 1953, Serial No. 353,944

19 Claims. (Cl. 200—88)

This invention relates to current responsive devices and, more particularly, to circuit interrupters of the type which are tripped instantaneously on overload currents of predetermined value and after a time delay on lesser overload currents.

One object of the invention is to provide a circuit interrupter embodying an improved trip device utilizing thermo-expansible members that are heated by induction.

Another object of the invention is to provide a circuit interrupter embodying a trip device actuated by thermo-expansible members inductively heated by a coil surrounding said members, the coil and the thermo-expansible members being arranged relative to each other to reduce the emissivity of heat from the active members.

Another object of the invention is to provide a circuit interrupter embodying a trip device actuated by a thermo-expansible device which operates an amplifying system of levers one of which levers is arranged to compensate the trip device for changes in ambient temperature.

The invention, both as to structure and operation, together with additional objects and advantages thereof, will be best understood from the following detailed description of several embodiments thereof when read in conjunction with the accompanying drawings.

The circuit breaker shown is of the type disclosed in Patent No. 2,458,151, issued January 4, 1949, to Hiller D. Dorfman and Gerald J. Freese and assigned to the assignee of the instant invention.

Figure 1:
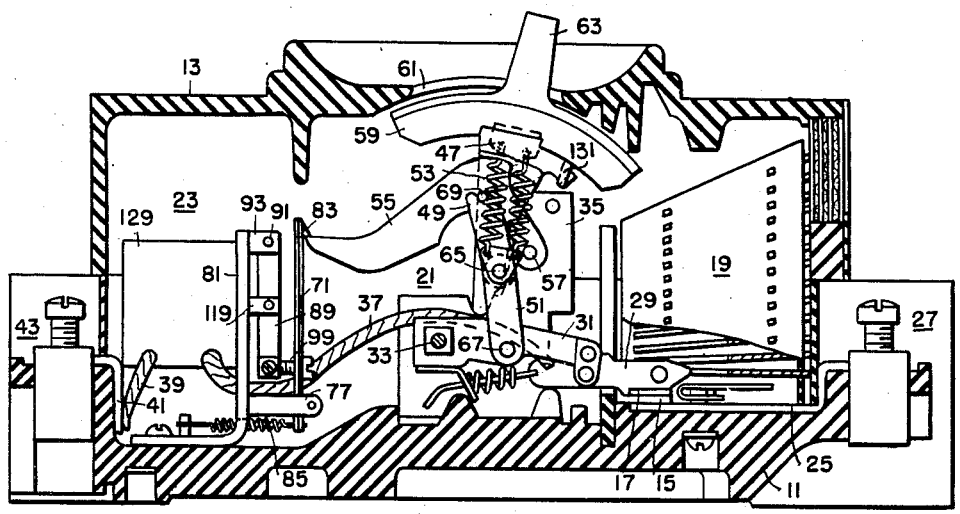
Figure 1 is a vertical sectional view of a circuit breaker embodying the principles of the invention.

Referring to Fig. 1 of the drawings, the circuit breaker includes a base 11 and a cover 13 both of molded insulating material which cooperate to form an enclosing housing for the breaker mechanism.

The circuit breaker is of the multi-pole type only the center pole being shown, and each pole comprises generally a stationary contact 15, a movable contact 17, and an arc extinguisher 19 and a trip device indicated generally at 23. An operating mechanism shown generally at 21 is mounted in the center pole of the breaker.

The stationary contact 15 for each pole of the breaker is rigidly mounted on the inner end of a conducting strap 25 which extends outside the housing and has a terminal connector 27 fixed to its outer end for connecting the breaker in an electrical circuit. The movable contact 17 for each pole is rigidly mounted on a contact arm 29 which is pivotally mounted at a point intermediate its ends on the free end of a switch arm 31. The switch arms 31 for all of the poles are mounted on a pivoted tie bar 33 which extends across all of the poles of the breaker. A flexible conductor 37 connects the contact arm 29 to the coil of the trip device and another flexible conductor 39 connects the coil of the trip device to the inner end of an angular conducting strap 41 which extends outside the breaker housing and has a terminal connector 43 secured to its outer end.

The operating mechanism 21 is disposed in the center pole of the breaker and comprises a forked operating lever 47, a toggle comprising toggle links 49 and 51, overcenter spring 53 and a releasable cradle 55 controlled by the trip device 23. The cradle 55 is pivotally supported on a frame comprising spaced frame members 35 by means of a pivot pin 57. The inner ends of the legs of the operating lever 47 are rounded and are pivotally seated in recesses in the frame members 35. An insulating shield 59 for covering an opening 61 in the cover 13 is mounted on this outer end of the operating lever 47 and a manual operating handle 63 integral with the shield 59 extends through the opening 61 to permit manual operation of the breaker mechanism.

The toggle links 49 and 51 are pivotally connected together by a knee pivot pin 65 and the toggle link 51 is pivotally connected by means of a pivot pin 67 to the switch arm 31 for the center pole of the breaker. The toggle link 49 is pivotally connected by means of a pivot pin 69 to the cradle 55. The overcenter springs 53 are connected under tension between the knee pivot pin 65 of the toggle 49—51 and the outer end of the operating lever 47.

The circuit breaker is opened manually by movement of the handle 63 counterclockwise from the position in which it is shown in Fig. 1. This movement carries the line of action of the overcenter springs 53 across to the left of the pivot pin 69 whereupon the springs 53 cause collapse of the toggle 49—51 and opening movement of the switch arms 31 for all of the poles.

In order to close the circuit breaker the handle 63 is moved clockwise back to the Fig. 1 position during which movement the line of action of the overcenter springs 53 is moved across to the right of the pivot 69 whereupon the force of the springs 53 straightens the toggle 49—51 thereby moving the switch arms 31 to the closed position.

The circuit breaker is automatically tripped open with an inverse time delay in response to persistent overload currents below a predetermined value of, for instance, 1000% of normal rated current by operation of the trip device 23. There is a trip device for each pole of the breaker, only the one for the center pole being shown. The trip device (Figs. 1 and 2) comprises an amplifying lever system including a trip lever 71 having a U-shaped bracket 73 rigidly secured thereto and having a hub 74 secured between the legs of the bracket 73 for securing the trip lever 71 to a trip bar 75 which extends across all of the poles of the breaker. The trip bar 75 is supported in the legs of a U-shaped bracket 77 mounted by means of a rivet 79 on an L-shaped support member 81 which, in turn, is rigidly secured to the base 11 of the breaker (Fig. 1). The support member 81 is formed of a material having low heat conductivity. At its upper end the trip lever 71 carries a latch member 83 which engages the free end of the cradle 55 and releasably restrains the cradle in operative position. A spring 85 having an end attached to the lower end of the trip member 71 and the other end hooked over a spring stud 87 on the support member 81 biases the latch lever 71 and the latch 83 into latching position. The spring 85 also serves to take up any backlash in the parts.

An actuating lever 89 forming a part of the amplifying lever system is disposed between the trip lever 71 and the support member 81 and has its upper end pivotally supported by means of a pivot pin 91 on a U-shaped bracket 93 secured by means of a rivet 95 to the upper end of the support member 81. The lower end of the actuating lever 89 has an enlarged portion 97 for threadedly receiving an adjusting screw 99 which extends through a clearance opening in the trip lever 71 and has a rounded head 101 disposed on the opposite side of the trip lever 71 from the actuating lever 89. A clamp screw 103 is provided in the portion 97 to clamp the adjusting screw 99 in the adjusted position.

Rigidly secured in an opening 105 in the vertical support member 81 is a cylindrical tube 107 composed of aluminum, aluminum alloy, magnesium, brass or other suitable metal having a high coefficient of expansion. One end of the tube 107 is closed as at 109 (Fig. 2) and the open end has a reduced portion which extends through the opening 105 and the end of the reduced portion of the tube 107 is formed over against the support member 81 to rigidly secure the tube 107 to the support member.

Disposed within the tube 107 is a core member 111 of magnetic material having a plurality of longitudinal openings 113 (Figs. 2 and 3) therein which openings are closed at the right end of the core member 111 and open at the left end facing the closed end of the tube 107. Disposed in each of the openings 113 is a tie rod 115 composed of a metal or metal alloy having a low or minimum coefficient of expansion. The right ends of the rods 115 are rigidly secured to the right end of the core member by suitable means such as riveting over the reduced ends of the rods. The left ends of the rods 115 are similarly secured to the closed end 109 of the tube 107 to thereby support the core member 111 within the tube 107 and rigidly connect the core member 111 to the closed end of the tube.

The core member 111 also has a central opening 117 formed thereon which opening is closed at the left end and open at the right end adjacent the open end of the tube 107. A connecting rod 119 which also has a low coefficient of expansion is disposed in the central opening 117 in the core member 111 and has its left end rigidly secured to the bottom of the opening 117. The right end of the connecting rod 119 is bifurcated to straddle the actuating lever 89 and is pivotally connected by means of a pivot pin 121 to the actuating lever.

An energizing or exciting coil 123 surrounds the tube 107 but is insulated therefrom by an insulating covering 125. The coil 123 is electrically connected in the circuit of the breaker by means of the flexible conductors 37 and 39 (Fig. 1). A washer 127 of magnetic material is disposed at each end of the coil 123 and a cup-shaped cover 129 of a material having low heat conductivity encloses the coil 123, the tube 107 and the core member 111.

The expansion parts 107 and 111 are heated by induction from the energizing or exciting coil 123 and the coil and the expansion parts are disposed relative to each other so as to reduce the emissivity of heat from the active parts. This makes the trip device particularly suitable for use in a transformer breaker when the breaker is immersed in oil.

Figure 2:
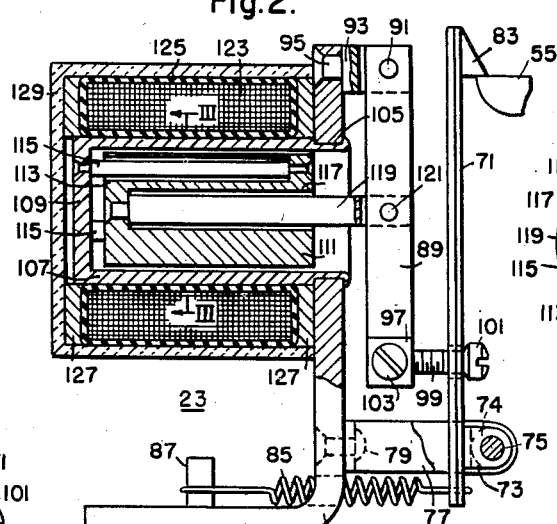
Fig. 2 is a vertical sectional view of the trip device.
Figure 3:
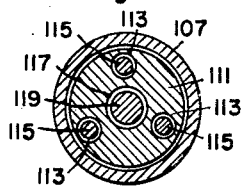
Fig. 3 is a transverse sectional view taken through the expansion device along line III—III of Fig. 2 and looking in the direction indicated by the arrows.
Figure 4:
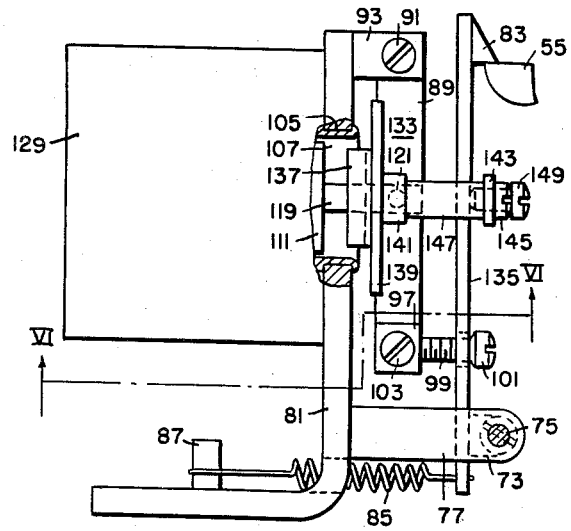
Fig. 4 is an elevation view, partly broken away, of the trip device shown in Fig. 2 arranged for time delay and instantaneous tripping.

If compensation for changes in the ambient temperature is required the trip lever 71 may be formed from a strip of bimetal, as shown in Fig. 2, having the high-expansion side disposed on the left so as to compensate the trip device for expansion or contraction of the active parts 107 and 111 in response to changes in the temperature of the oil or surrounding medium. If ambient temperature compensation is not required the trip lever is formed from a strip having a single thickness of metal as shown in Fig. 4.

With normal rated current flowing in the circuit through the breaker, the heat resulting from the inductive action of the exciting coil 123 is such that the parts are maintained in the positions shown in Fig. 2.

When an overload current occurs in any pole of the breaker, the inductive action of the coil 123 in the affected pole increases resulting in an increase in the heat induced in the expansion parts 107 and 111. This causes the expansion tube 107 to expand from its support on the bracket 81 toward the left which, through the rods 115 moves the core 111 bodily toward the left. At the same time the core 111 expands from its support at the right ends of the rods 115 toward the left moving the rod 119 bodily therewith. The leftward movement of the rod 119 caused by the compound additive expansion of the tube 107 and the core 111 acts through the pivotal connection 121 with the actuating lever 89 to move this lever clockwise about its pivot 91. This clockwise movement of the actuating lever 89 acts through the adjusting screw 99 to rotate the trip lever 71 and the common trip bar 75 counterclockwise to disengage the latch 83 from the releasable cradle 55. Upon release of the cradle 55 (Fig. 1) the overcenter springs 53 cause clockwise rotation of the cradle about its pivot 57. This movement carries the pivot pin 69 at the upper end of the toggle 49—51 across to the right of the line of action of the overcenter springs 53 which thus act to collapse the toggle 49—51 and move the switch arm 31 to open position to open the contacts with a snap action.

Before the contacts can be closed following an automatic opening operation it is necessary to reset and re-latch the mechanism. This is accomplished by moving the operating lever 47, by means of the handle 63, as far as it will go in a counterclockwise direction. During this movement a yoke portion 131 of the operating lever 47 engages the cradle 55 and moves it back to its latched position. If the expansion parts 107 and 111 have cooled and resumed their normal positions as shown in Fig. 2, the latch 83 will reengage the cradle 55 and restrain it in the position shown in Fig. 1. After the mechanism is reset and relatched the circuit breaker is closed in the previously described manner by movement of the handle 63 back to the Fig. 1 position.

Figure 5:
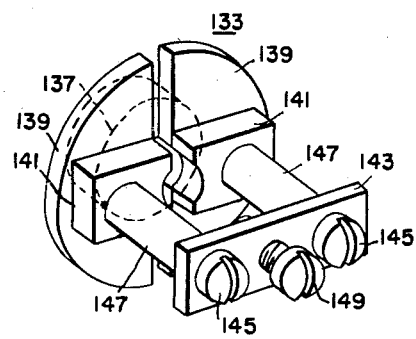
Fig. 5 is a perspective view of the armature mechanism for providing instantaneous tripping in the trip device shown in Figs. 2 and 4.
Figure 6:
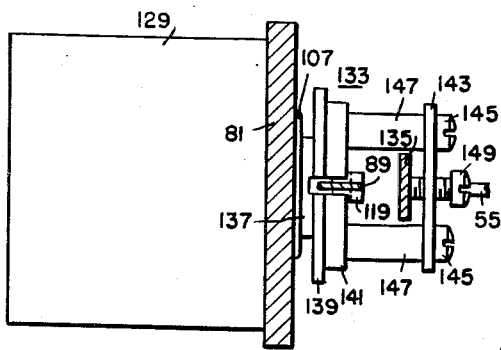
Fig. 6 is a bottom view, partly in section, of the trip device shown in Fig. 4, taken substantially along line VI—VI of Fig. 4.

Provision is made for tripping the breaker open instantaneously in response to an overload current, for instance of 1000% or more of normal rated current or in response to a short circuit current. The means for effecting instantaneous tripping comprises an armature mechanism indicated generally at 133 (Figs. 4, 5 and 6) and slidably mounted on the rod 119 and having a portion extending back of a trip lever 135. The trip lever 135 is similar to the trip lever 71 of Fig. 2 except that it is constructed of solid metal instead of bimetal. The other parts shown in Fig. 4 are the same as those of Fig. 2 and have been given the same reference numerals.

The armature comprises a disc 137 of magnetic material having a central opening therein through which the connecting rod 119 extends to support the armature. Rigidly secured to the disc 137 preferably by welding is a pair of semicircular members 139 disposed one on each side of the actuating lever 89 and a pair of spaced blocks 141 are secured to the members 139 on the side opposite the disc 137. A yoke 143 is supported by means of screws 145 threadedly engaging the blocks 141 and is spaced from the blocks 141 by spacers 147 surrounding the screws 145. The yoke 143 is disposed to the right of the trip lever 135 and carries an adjusting screw 149 which is adapted to engage and actuate the trip lever 135 upon operation of the armature.

Upon the occurrence of an overload of, for instance, 1000% or more of normal rated current, or on short circuit current, the coil 123 (Fig. 2) is energized sufficiently to actuate the armature mechanism 133 which acts through the yoke 143 and adjusting screw 149 to move the trip lever 135 and effect instantaneous opening of the circuit breaker.

Following an automatic opening operation of the breaker the mechanism is reset and the contacts closed by manipulation of the breaker handle in the manner previously described.

If ambient temperature compensation is required together with instantaneous and time delay tripping the bimetallic trip lever 71 of Fig. 2 may readily by substituted for the trip lever 135 in Fig. 4 or the armature mechanism 133 (Fig. 5) may be assembled in the trip device shown in Fig. 2 since the parts are interchangeable.

Figure 7:
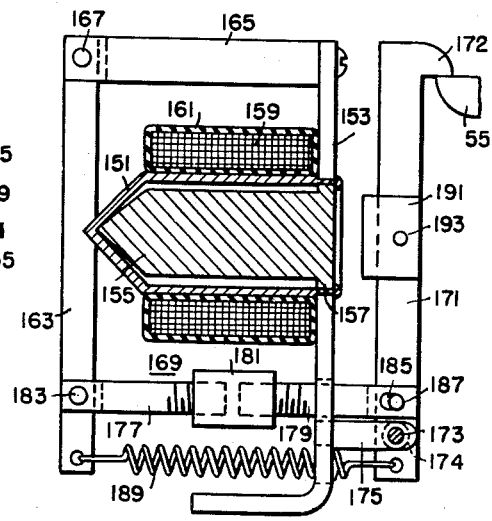
Fig. 7 is a vertical sectional view of a modification of the trip device.

According to the modification of the invention illustrated in Fig. 7 of the drawings, an expansion tube 151 is rigidly secured in an opening in an angle bracket 153 and has a core member 155 of magnetic material mounted therein. The left hand ends of the expansion tube 151 and the core member 155 are both conical with the apex of the core member 155 engaging in the inner apex of the tube 151. The right hand end of the core member has a flange 157 thereon and the reduced annular end of the tube is formed over against the bracket 153 and the end of the flange 157 to rigidly hold the members in place. An exciting or energizing coil 159 encased in insulation 161 surrounds the expansion tube 151 and is connected in the circuit of the breaker in the same manner shown in Fig. 1 for connecting the coil 123 in the circuit. An actuating lever 163 has one end pivotally supported on a support member 165 which may be formed of a material having a high coefficient of expansion. The support member 165 is rigidly supported on the upper end of the bracket 153 and the actuating lever 163 is mounted by means of a pivot pin 167 on the left end of the support member 165. At a point near its lower end the actuating lever 163 is connected by means of an adjustable connecting rod 169 to a trip lever 171 mounted on a trip bar 173 by means of a hub 174 secured to the trip lever 171 and to the trip bar 173. The trip bar 173 is pivotally supported in a bracket 175 mounted on the bracket 153. The trip lever 171 has a latch portion 172 normally engaging the releasable cradle 55 of the breaker mechanism. The connecting rod 169 comprises two rods 177 and 179 having oppositely threaded ends which threadedly engage a turnbuckle 181. By rotating the turnbuckle 181 the rods 177—179 are separated or drawn closer together to adjust the length of the connecting rod 169 and thereby adjust the amount of latch overlap. The left end of the rod 177 is bifurcated and is pivotally connected to the actuating lever 163 by a pivot pin 183. The right end of the rod 179 is bifurcated to straddle the trip lever 171 and elongated slots 185 in the bifurcated portions of the rod 179 engage a pin 187 in the trip lever 171. A spring 189 connected under tension between the trip lever 171 and the lower end of the actuating lever 163 biases the trip lever to latching position and biases the pin 187 into engagement with the right end of the slots 185. A slotted armature 191 is rigidly mounted by means of a rivet 193 on the trip lever 171 opposite the right end of the core 155.

With normal rated current in the circuit of the breaker, the heat resulting from the inductive action of the coil 159 is not sufficient to cause the tube 151 to expand and the parts of the device are maintained in the position in which they appear in Fig. 7.

When a low persistent overload current occurs the inductive action of the coil 159 increases resulting in increased heating of the expansion tube 151 causing the tube to expand and move the left end thereof toward the left. The apex of the conical left end of the tube 151 is seated in a notch in the actuating lever 163 and the expansion of the tube causes clockwise rotation of the actuating lever 163 about its pivot 167. This movement is transmitted through the connecting rod 169 to the trip lever 171 moving this lever and the trip bar 173 counterclockwise to disengage the latch portion 172 thereof from the cradle 55 then effecting automatic opening of the breaker in the manner previously described.

Upon the occurrence of a high overload current of, for instance, 1000% or more of normal rated current or a short circuit current the coil 159 (Fig. 7) is energized sufficiently to attract the armature 191 and actuate the trip lever 171 and the trip bar 175 instantaneously to release the cradle 55.

Compensation for changes in the ambient temperature is accomplished by making the support member 165 for the actuating lever 163 and the connecting rod 169 of the same material and of substantially the same length as the expansion tube 151. All three of these members will expand or contract in response to changes in the ambient temperature substantially the same extent without changing the tripping time of the breaker. If ambient temperature compensation is not desired the support member 165 and the connecting rod 169 may be made of a material having a low coefficient of expansion.

Figure 8:
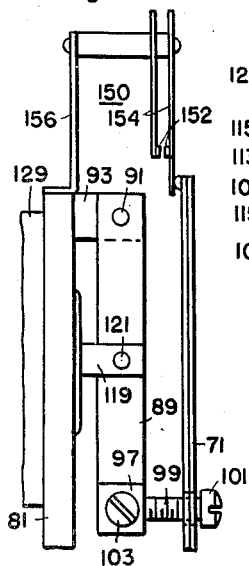
Fig. 8 is a fragmentary elevational view showing a portion of the device arranged for service as a time-delay contactor.

As shown in Fig. 8, the device may serve to operate a switch. The switch, indicated generally at 150, comprises a pair of contacts 152 mounted on spring contact blades 154 which, in turn, are mounted on but insulated from a bracket 156 suitably supported on the upper end of the support member 81. Upon operation of the device in the previously described manner, the lever 71 engages and actuates the adjacent switch blade 154 to close the contacts 152.

The invention provides an improved time-delay trip device operated by thermo-expansible members that are heated by induction from an exciting coil energized by overload currents. The exciting coil and the active parts of the device are so disposed relative to each other as to minimize the emission of heat from the active parts. This arrangement of the parts particularly adapts the device for immersion in oil. Provision is also made for operating the trip device to instantaneously trip the breaker. The lever system of the device is also constructed from expansible material and arranged to compensate the trip device for changes in ambient temperature. Adjusting means is also provided for varying both the time-delay and instantaneous tripping time of the breaker.

I claim as my invention:

1. In a trip device having a support member, a member movable to effect an operation, a linearly expansible tube having an open end secured to said support member and expansible in response to increase in temperature, connecting means interconnecting a closed end of said expansible tube and said movable member, said tube moving only in a linear direction to positively actuate said movable member upon predetermined lineal expansion of said tube, and a coil surrounding said tube inductively heating said tube.

2. In a trip device having a member movable to effect an operation, an expansible tube having one end open and the other end closed, the open end of said tube being supported and the closed end free, said tube being expansible in response to increase in temperature, connecting means interconnecting the free end of said tube and said movable member, the free end of said tube moving only in a linear direction to positively actuate said movable member upon predetermined expansion of said tube, and a current carrying coil surrounding said tube inductively heating said tube.

3. In a trip device having means operable to effect an operation, an expansible tube having one end open and the other end closed, the open end of said tube being supported and the closed end free, said tube expanding in response to increase in temperature, a plurality of amplifying levers interconnecting the closed end of said tube and said means, the closed end of said tube moving only in a linear direction to positively operate said trip means upon expansion of said tube, and a current carrying coil surrounding said tube inductively heating said tube.

4. In a trip device having means operable to effect an operation, a linearly expansible tube having one end open and the other end closed, said open end of said tube being supported and the closed end free, said tube expanding in response to increase in temperatures, connecting means comprising an amplifying lever system interconnecting the closed end of said tube and said means, the force of the linear expansion of said tube positively operating said means, a current carrying coil for inductively heating said expansible tube, and a movable part of said connecting means being formed from a temperature responsive material to compensate said device for changes in ambient temperature.

5. In a trip device having a trip member movable to effect a tripping operation, a linearly expansible tube expansible in response to increase in temperature, said tube having an open end fixedly mounted and the other end free, connecting means interconnecting the closed end of said expansible tube and said trip member for positively moving said trip member upon linear expansion of said tube, a current carrying coil surrounding said tube inductively heating said tube in response to currents below a predetermined value, an armature adjacent the open end of said tube for actuating said trip member, and a magnetic member disposed entirely within said tube to be energized by said coil in response to currents above said predetermined value to attract said armature and instantaneously actuate said trip member.

6. In a trip device having a trip member movable to effect a tripping operation, an expansible tube expansible in response to increase in temperature, said tube having an open end fixedly mounted and a closed end free, connecting means interconnecting the closed end of said expansible tube and said trip member for positively moving said trip member upon expansion of said tube, a current carrying coil surrounding said tube for inductively heating said tube in response to currents below a predetermined value, an armature adjacent the open end of said tube for actuating said trip member, and a magnetic member disposed entirely within said expansible tube to be energized by said coil in response to currents above said predetermined value to attract said armature and instantaneously actuate said trip member.

7. In a trip device having a trip member movable to effect a tripping operation, a linearly expansible tube expansible in response to increase in temperature, said tube having an open end fixedly mounted and the other end free, connecting means comprising a linkage interconnecting the free end of said expansible tube and said trip member, said connecting means being moved by linear expansion of said tube to positively move said trip member, a current carrying coil surrounding said tube for inductively heating said tube in response to currents below a predetermined value, a movable portion of said linkage consisting of a temperature responsive material disposed to compensate said trip device for changes in ambient temperature, an armature for actuating said trip member, and a magnetic member disposed entirely with said expansible tube to be energized by said coil in response to currents above said predetermined value to attract said armature and instantaneously actuate said trip member.

8. In a trip device having a trip member movable to effect a tripping operation, an expansible tube expansible in response to increase in temperature, said tube having an open end fixedly mounted and the other end free, connecting means interconnecting the free end of said expansible tube and said trip member, said connecting means being movable to positively move said trip member by expansion of said tube, a current carrying coil surrounding said tube for inductively heating said tube in response to currents below a predetermined value, a movable portion of said connecting means consisting of a temperature-responsive material disposed to compensate said trip device for changes in ambient temperature, an armature for actuating said trip member, and a magnetic member disposed entirely within said expansible tube to be energized by said coil in response to currents above said predetermined value to attract said armature and instantaneously actuate said trip member.

9. In a trip device having means operable to effect an operation, a linearly expansible tube having one end supported and the other end free, said tube expanding linearly in response to increase in temperature, a plurality of serially connected amplifying levers interconnecting the free end of said tube and said means for operating said means upon linear expansion of said tube, one of said amplifying levers being formed from a strip of bimetallic material and deflecting in response to changes in ambient temperature to compensate said trip device and a current carrying coil surrounding said tube inductively heating said tube.

10. In a trip device having a mechanism movable to effect an operation, a first linearly expansible member expansible in response to increase in temperature, a second linearly expansible member expansible in response to increase in temperature, said second expansible member being serially connected to said first expansible member so that expansion of said expansible members is additive, connecting means connecting said second expansible member to said mechanism to transmit the additive expansive movement of said expansible members to said mechanism, and a current carrying coil inductively heating said expansible members.

11. In a trip device having a trip mechanism movable to effect a tripping operation, a first expansible member comprising a tube having one end supported and the other end free expansible in response to increase in temperature, a second expansible member disposed within said tube having one end supported and the other end free expansible in response to increase in temperature, said second expansible member being serially connected to said first expansible member so that expansion of said expansible members is additive, connecting means connecting the free end of said second expansible member to said trip mechanism to transmit the combined additive expansion movement of both of said expansible members to said trip mechanism, and a current carrying coil inductively heating said expansible members.

12. In a trip device having a mechanism movable to effect an operation, a first expansible member comprising a tube expansible in response to increase in temperature, a second expansible member of magnetic material disposed within said tube expansible in response to increase in temperature, said second expansible member being connected to said first expansible member so that expansion of said first expansible member bodily moves said second expansible member, connecting means connecting said second expansible member to said mechanism to transmit the combined expansion movement of both of said expansible members to said mechanism, a current carrying coil for inductively heating said expansible members, and an armature disposed to engage said mechanism and operable upon energization of said coil in response to certain conditions to actuate said mechanism.

13. In a trip device for a circuit breaker, latch means operable to effect a tripping operation, a linearly expansible member having a relatively high coefficient of expansion and expansible in response to increase in temperature, a second linearly expansible member having a relatively high coefficient of expansion and expansible in response to increase of temperature, connecting means of a material having a relatively low coefficient of expansion serially mechanically connecting said first and said second expansible members so that expansion of said expansible members is in the same linear direction, lever means for operating said latch means, a member having a relatively low coefficient of expansion connecting said second expansible member to said lever means, and a current carrying coil disposed to inductively heat said expansible members.

14. In a trip device for a circuit breaker, latch means operable to effect a tripping operation, a linearly expansible member comprising a tube having a relatively high coefficient of expansion and expansible in response to increase in temperature, a second linearly expansible member disposed in said tube and expansible in the same linear direction as said tube, said second expansible member having a relatively high coefficient of expansion and expansible in response to increase of temperature, connecting means of a material having a relatively low coefficient of expansion serially connecting said first and said second expansible members so that expansion of said expansible members is additive, lever means for operating said latch means, a member having a relatively low coefficient of expansion connecting said second expansible member to said lever means, and a current carrying coil disposed to inductively heat said expansible members.

15. In a trip device having a tripping mechanism operable to effect a tripping operation, a tubular expansible member having one end supported and the other end free, an expansible core member disposed within said tubular expansible member, said expansible members expanding in response to increase in temperature, a plurality of connecting members having relatively low coefficient of expansion mounted on the free end of said tubular expansible member supporting the end of said expansible core member adjacent the supported end of said tubular expansible member so that said expansible members are in series mechanical relation, and a member connecting the end of said expansible core member adjacent the free end of said tubular expansible member to said tripping mechanism whereby the expansion of both of said expansible members is additively applied to said tripping mechanism to operate said tripping mechanism, and a current carrying coil disposed to inductively heat said expansible members.

16. In a trip device for a circuit breaker comprising a pivoted trip lever operable to effect a tripping operation, a tubular expansible member supported at one end and having the other end free, a pivoted actuating lever disposed adjacent the free end of said expansible member to be actuated by expansion of said expansible member, a connection between said actuating lever and said trip lever for actuating said trip lever upon expansion of said expansible member, a current carrying energizing coil for inductively heating said expansible member in response to certain conditions, and electromagnetic means comprising a fixed core member disposed in said tubular expansible member and an armature mounted on said trip lever, said electromagnetic means being operable upon energization of said coil in response to certain other conditions to operate said trip lever.

17. A trip device for a circuit breaker comprising a linearly expansible tube supported at one end and having the other end movable, a pivoted trip lever disposed adjacent the supported end of said tube and operable to effect a tripping operation, a pivoted actuating lever disposed adjacent the movable end of said expansible tube to be actuated by the thrust of the linear expansion of said expansible tube, an adjustable member operatively connecting said actuating lever and said trip lever for actuating said trip lever upon expansion of said tube, and a current carrying coil inductively heating said expansible tube in response to certain conditions.

18. An electrical apparatus having contact means, an expansible tube having one end open and the other end closed, the open end of said tube being supported and the other end movable, said tube being expansible in response to increased temperature, a movable member disposed adjacent the supported end of said tube operable to effect operation of said contacts, a lever adjacent the free end of said tube, connecting means connecting said lever to said movable member, the movable end of said tube engaging said lever and actuating said movable member upon predetermined expansion of said tube, and a coil surrounding said tube inductively heating said tube.

19. In an electrical apparatus having contact means, an expansible tube expansible in response to increase in temperature, a member disposed adjacent one end of said tube and movable to effect operation of said contact means, an actuating lever disposed adjacent the other end of said tube, a linkage interconnecting said movable member and said actuating lever, said actuating lever being movable by the thrust of said tube to move said movable member and actuate said contact means after a time delay, a current carrying coil surrounding said tube inductively heating said tube in response to currents below a predetermined value, an armature on said movable member, and a magnetic member disposed entirely within said tube energized by said coil in response to currents above said predetermined value to attract said armature and actuate said movable member to instantaneously actuate said contact means.

References Cited in the file of this patent

UNITED STATES PATENTS

| 773,182 | Ayer | Oct. 25, 1904 |
| 1,118,608 | Wilkinson | Nov. 24, 1914 |
| 1,231,200 | Rollinson | June 26, 1917 |
| 1,292,516 | Robertshaw | Jan. 28, 1919 |
| 1,692,474 | Traver | Nov. 20, 1928 |
| 1,692,486 | Cohn | Nov. 20, 1928 |
| 1,706,042 | Radley | Mar. 19, 1929 |
| 1,732,182 | Denison | Oct. 15, 1929 |
| 1,831,558 | Hall | Nov. 10, 1931 |
| 2,051,380 | Jones | Aug. 18, 1936 |
| 2,069,003 | Beman | Jan. 26, 1937 |
| 2,170,412 | Jennings | Aug. 22, 1939 |
| 2,234,700 | Jones | Mar. 11, 1941 |
| 2,476,022 | Bennett | July 12, 1949 |

FOREIGN PATENTS

| 171,151 | Switzerland | Jan. 16, 1935 |